June 6, 1972     K. S. PENNINGTON ET AL     3,667,831
THREE-DIMENSIONAL ZONE PLATE GRID ENCODING AND DECODING
Filed Dec. 23, 1969     3 Sheets-Sheet 1

INVENTORS
KEITH S. PENNINGTON
GLENMORE L. SHELTON, JR.
PETER M. WILL

BY *Graham S. Jones*
ATTORNEY

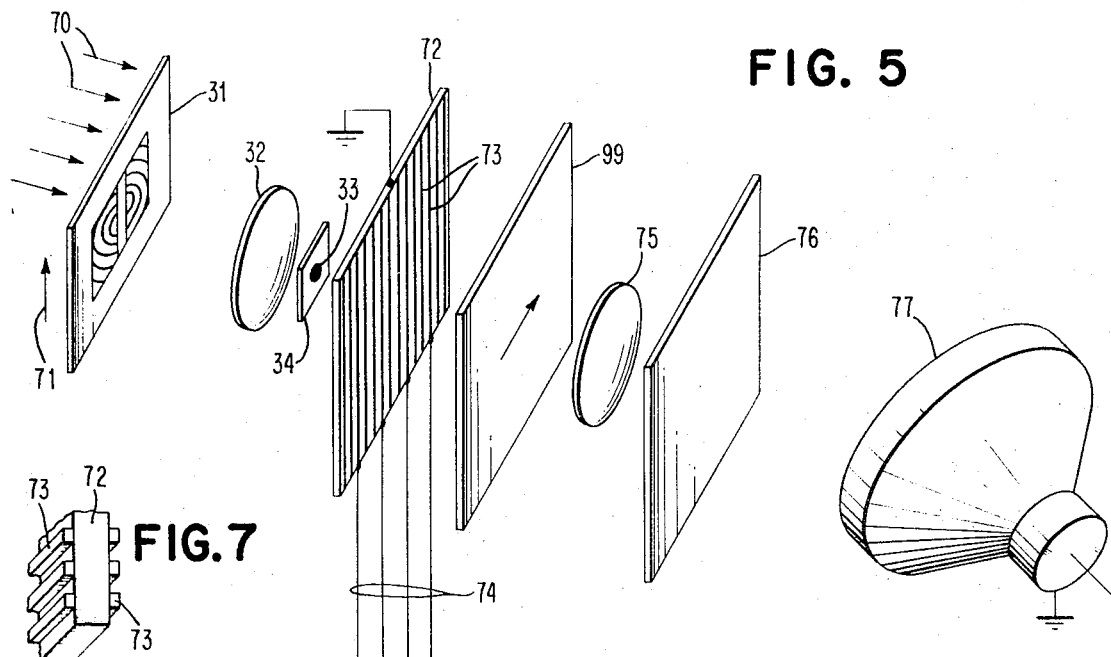
FIG. 5
FIG. 7
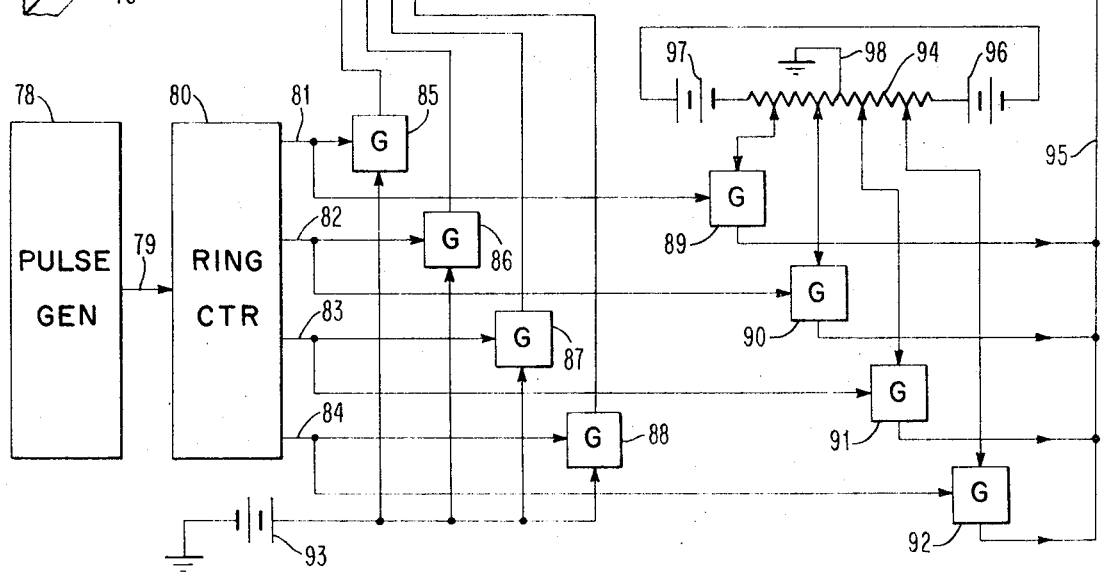
FIG. 6
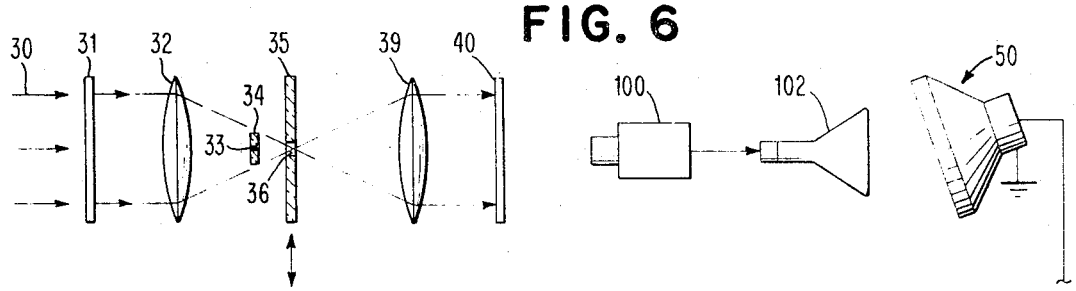

United States Patent Office 3,667,831
Patented June 6, 1972

3,667,831
THREE-DIMENSIONAL ZONE PLATE GRID
ENCODING AND DECODING
Keith S. Pennington, Somers, and Glenmore L. Shelton, Jr., Carmel, N.Y., and Peter M. Will, Norwalk, Conn., assignors to International Business Machines Corporation, Armonk, N.Y.
Filed Dec. 23, 1969, Ser. No. 887,687
Int. Cl. G02b 27/38
U.S. Cl. 350—162 SF
22 Claims

ABSTRACT OF THE DISCLOSURE

Depth of range information is extracted by projecting the image of a zone plate upon a scene and photographing the scene at a different angle from the zone plate source. A transparency of the photograph including zone plate modulation of the scene formed on planes in the scene is then filtered by a scanning slit at the zone plate focal plane and presented upon an output screen from end to end, as a function of original range, from the zone plate. The reflection of the image upon the screen in viewed in a varifocal mirror driven in synchronism with scanning by the filter. The screen and the varifocal mirror may be connected by a low-bandwidth, video channel and a channel for control signals for the mirror.

FIELD OF INVENTION

The present invention is in the field of image analysis and processing, and more particularly, relates to coding images and processing the coded images to obtain depth of position information relative to the field of view.

SUMMARY OF THE INVENTION

In the transmission of images by electronic means, channel bandwidth is an important economic factor. Three-dimensional transmission of data requires far more bandwidth than say conventional two-dimensional television. Accordingly, it is desirable to be able to transmit information relating to a scene in the form of a coded-two dimensional image which can be simply decoded to simulate a three-dimensional scene in order to use a "narrow bandwidth" channel for three-dimensional transmission.

In the presentation of three-dimensional scenes, it would be desirable to be able to use a single photograph or similar image record to provide a three-dimensional image.

An object of this invention is to provide a method and apparatus for presenting depth of range information with a simple optical technique.

Another object of this invention is to provide a method and apparatus for presenting three-dimensional images with a single intermediate image bearing medium.

Still another object of this invention is to provide means for presenting a two-dimensional image suitable for transmission on a standard television channel and processed to provide a three-dimensional image with minimal increase of bandwidth requirements.

Another object of this invention is to provide a method system and apparatus for encoding depth of scene information for input to data processing machines.

A related object of this invention is to input zone plate, grid-coded data into electronic scanning circuits as a function of depth.

This invention includes a method, system and apparatus for projecting the image of a zone plate pattern towards a scene to encode it with a pattern indicative of the depth of location or range in the scene, receiving the resultant coded image and employing it to analyze the scene for range by a filtering process. Further in conjunction with the analysis by filtering, a variable surface member may be activated to present the resultant image at various real or apparent distances from a viewer to reconstruct a representation of the three-dimensional scene. Filtering may comprise employing a thin slit to scan a transformation of a representation of the image illuminated with collimated monochromatic light.

The foregoing and other objects, features and advantages of the invention will be apparent from the following more particular description of a preferred embodiment of the invention, as illustrated in the accompanying drawings.

BRIEF DESCRIPTION OF THE DRAWING

FIG. 5 is an alternative apparatus to that of FIG. 4.

FIG. 6 shows a system for transmitting the scene of FIG. 4 via television for remote viewing.

FIG. 7 shows a fragment of an electro-optical scanning filter shown in FIG. 5.

DETAILED DESCRIPTION

Figure 1:
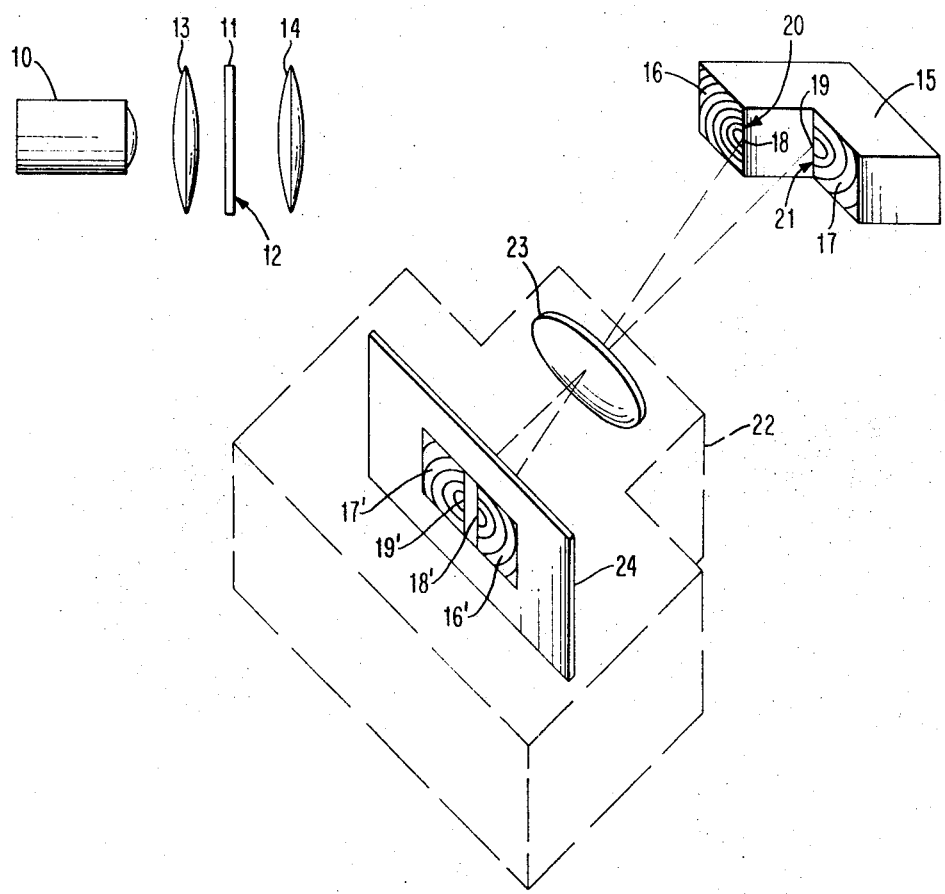
FIG. 1 is a partially isometric view of appparatus for endcoding a scene with a zone plate grid and photographing a view of such scene.

In FIG. 1, a source of light 10 is projected through condensing lens 13 towards transparent member 11 carrying pattern 12 in the form of a zone plate. A zone plate comprises a special screen composed of opaque and transparent areas in the form of concentric circles. See Fundamentals of Optics, Jenkins and White, McGraw-Hill, 1957, pages 355–361. In practice, the concentric circles are formed with radii proportional to the square roots of whole numbers. Every other circle is blackened and the result can be photographed on a reduced scale. A linear or (one-dimensional) zone plate may be used. The spatial frequency of the grid bars is the reciprocal of separation which varies linearly with distance. It has the property that parallel stripes are made where frequency increases from one end to the other. See commonly assigned U.S. Pat. No. 3,402,001 of Fleisher dated Sept. 17, 1968.

Lens 14 focuses light from the zone plate on the scene. The light passing through lens 14 is projected upon an object 15, and surfaces 16 and 17 thereof are illuminated with a zone plate grid pattern. For convenience of explanation, a special object 15 has been selected with edges 20 and 21 centered on the axis of the projected zone plate. The center 18 and the center 19 are shown formed on edges 20 and 21 of object 15 in order to illustrate the fact that opposite halves of the zone plate circles lie on the surfaces 16 and 17. It will be noted that the spacing of the lines of the grid pattern on surface 16 is somewhat closer together than the spacing of lines on surface 17. This is so because the zone plate has been projected a shorter distance in the case of surface 16 than it has in the case of surface 17. Accordingly, the spacing between the grid lines varies as a function of distance from the zone plate 12. A camera 22 includes a lens 23 and a film 24. On the film 24 is shown the illumination pattern of the zone plate 12 on the object 15 as projected through the lens 23. The pattern received on film 24, because of use of matched transmission lens 14 and receiving lens 23 is a mixture of portions of zone plates having substantially the same focal length. Matched lenses are used in accordance with this preferred embodiment for reasons described below. It will be noted that the centers 18' and 19' are shown as being spaced apart. Quite apparently, the center of the zone plate has been shifted as a function of distance. Thus, range information has been translated into lateral displacement of the various zone plate foci. In other words, two new partial zone plates have been formed on the negative film 24. These new partial zone plates have centers at 18' and 19'. The zone plate patterns formed in the camera 22 on film 24 can now be used for the purpose of producing a zone plate photograph in the form of a transparency or screen as will be employed in connection with FIGS. 4, 5 and 6 for the purpose of extracting the range information by a simple aperture in an optical processor. Alternatively to the technique shown in FIG. 1, zone plate patterns may be formed on the scene by interference between two coherent beams. This technique allows a very high spatial frequency of fringes to be obtained. In addition, the use of interference techniques allows increased depth of field since they are in focus at all planes in depth.

Figure 3:
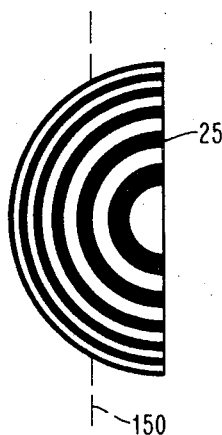
FIG. 3 shows half a zone plate for the purpose of projecting a finer grain zone plate pattern upon a scene.
Figure 2:
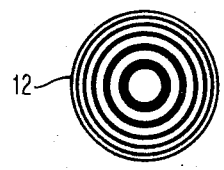
FIG. 2 shows a zone plate pattern.

Relative to FIG. 3, a modified view of a zone plate screen is shown as indicated by the pattern 25. It will be noted that only one-half of a zone plate is illustrated to indicate that it would not be necessary to use an entire zone plate screen in order to provide the kind of grid line structure desired. The type of zone plate structure in FIGS. 1 and 2 is shown simply to illustrate the fact that the centers will be separated as is nicely illustrated by the pattern formed on object 15. However, it would be desirable in order to avoid loss of information at the center of the pattern because of the low sampling frequency, i.e., wide spacing between rings, to project on the scene only a portion of the zone plate, removed from the center e.g., to the left of line 150 in FIG. 3. Many rings in addition to those shown schematically in FIG. 3 would be used.

Figure 4:
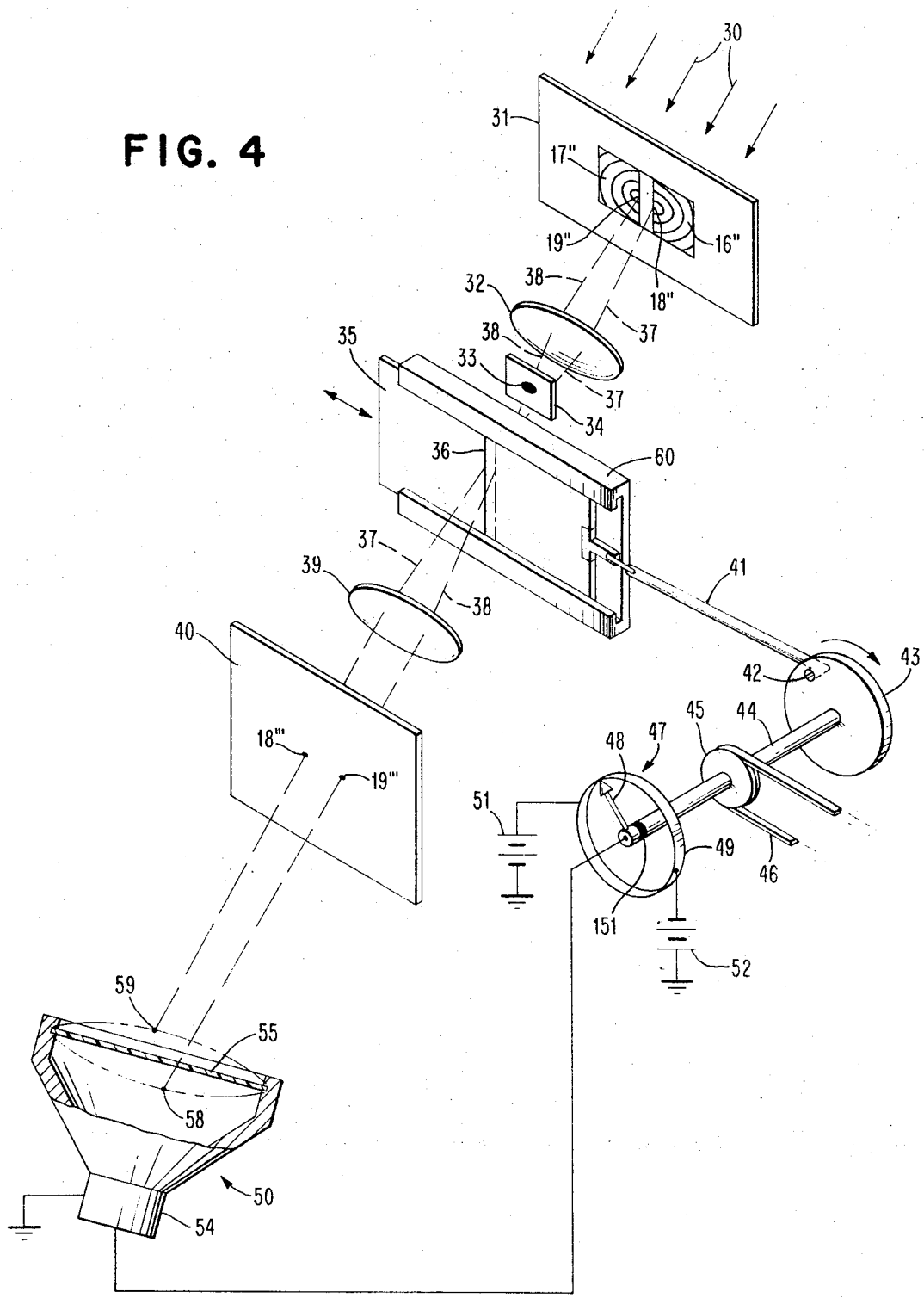
FIG. 4 shows an isometric view of apparatus for producing a simulated view of a photographic transparency made as shown in FIG. 1.

Referring now to FIG. 4, we see a source of laser light or monochromatic collimated light 30 passing through a transparency 31 carrying the photograph produced from the film 24 in the form of a transparency. Centers 18" and 19" of surfaces 16" and 17" are shown. A circular zone plate acts somewhat like a spherical lens and tends to focus light at a point on its optical axis forming a bright spot. (See Jenkins and White.) Likewise, a linear zone plate focuses light like a cylindrical lens, in that it will focus light from a point into a straight line. Monochromatic or laser light passing through the two partial zone plates such as 16" or 17" tends, when passed through a lens such as lens 32, to focus on predetermined points which are somewhat different from the focal point provided by the lens 32. The matched projection lens 14 and recording lens 23 described in connection with FIG. 1 above ensures that the partial zone plates have the same focal length and therefore both focus on a plane substantially orthogonal to the optical axis. Otherwise the light from the zone plates will focus elsewhere than on the desired planar surface, and the filtering taught below is complicated by that fact. Lens 32 would cause light 30 to focus at a point 33 in the absence of zone plates. An opaque stop 34 is placed at point 33. Filter 35 is placed in the plane defined by the focal points resulting from the combinations of the zone plate patterns 16" and 17". As is well known, zone plates have both positive and negative power, etc., combined with lens 32. Here the negative power of the zone plate is used preferably although positive or negative power can be employed in modified embodiments. However, the point of focus of the particular zone plates 16", 17" will vary laterally along the filter 35. The lateral positional offset from the optical axis carries the range information. The offsets are uniaxial with the apparent centers of the partial zone plates. Thus, light through zone plate 16" will pass through slit 36 of filter 35 somewhat to the left of light from filter 17". Line 37 from center 18" travels through slit 36 a little to the left of line 38 from center 19". As slit 36 is moved across the plane of filter 35, light from zone plate 17" will be filtered by slit 36 and projected upon screen 40 through lens 39 with the center 19" and the remainder of the pattern 17" being projected on screen 40 (not shown) being projected at point 19'''. In the case of projection of an off axis fragment of a zone plate, zone plate points 19" and 19''' could represent apparent zone plate centers. Similarly, at another position of slit 36, the light passing through the zone plate 16" will be projected through slit 36 by lens 32 and lens 39 onto screen 40, projecting center 18''' thereon and the remainder of the pattern 16" projected on screen 40 (not illustrated herein). However, the time in which the two images will be projected upon screen 40 is separated by the times at which the slit 36 intercepts the two foci of the two zone plates 16" and 17". The filter 35 is located substantially in the plane in which the light passing through the zone plate is found to focus or pass through a small slit, i.e., at the focal length of the partial zone plates and the optical system. If one were to use unequal transmitting and receiving lenses in FIG. 1, the arrangement would result in a non planar focussing surface (i.e., the surface defined by points of focus of many zone plates). An orthogonal plane is the preferred embodiment.

The filter 35 is carried slidably by frame 60 and is driven by a rod 41 connected at its opposite end to a pin 42 secured to wheel 43 serving as a crank. Wheel 43 is secured to shaft 44 carrying pulley 45 which is driven by a belt 46. At the opposite end of shaft 44 is a potentiometer 47 whose contact arm 48 coupled through insulator 151 is driven by shaft 44. The resistive portion 49 of potentiometer 47 is designed as a nonlinear function of position having resistance values which vary to produce a pattern which synchronizes the motion of a varifocal mirror 50 to the horizontal, simple harmonic motion of the filter 35. The potentiometer 47 is connected to two sources 51 and 52 positive and negative bias relative to ground at opposed points to operate the varifocal mirror 50, which is driven by a loud speaker 54 so that the plastic surface 55 of the varifocal mirror will be fully extended so that center 19''' will be projected to point 58 and battery 52 will cause the loud speaker 54 to be so phased that the surface 55 will be retracted so that point 18''' will shine at point 59 thereby presenting to the viewer a three-dimensional image. A three-dimensional image will be such that the back part of the original object will appear to be farther away and the front part of the original object will appear to be closer to the viewer.

Descriptions of use of varifocal mirrors are included in the publications as follows:

Vibrating Varifocal Mirrors for 3-D Imaging, Eric G. Rawson IEEE Spectrum pp. 37–43, September 1969, and Steroscopic Display Using Rapid Varifocal Mirror Oscillations, Alan C. Traub, Applied Optics, vol. 6, No. 6 pp. 1085–1087, June 1967.

Referring to FIG. 5, the photographic transparency 31 has light projected thereon from a light source 70 which is either monochromatic or coherent, preferably the latter. As illustrated by arrow 71, the light is vertically polarized. The lens 32 has a normal focal length focussing on lens stop 33 in member 34. However, as in connection with FIG. 4, the focal length of the light passing through the photographs with the zone plate markings or grids on transparency 31 will focus in the plane of the member 72 which is transparent and has transparent tin oxide film electrodes 73 on each side as shown in FIG. 7. The member 72 is comprised of potassium dihydrogen phosphate (KDP). This latter chemical exhibits the linear electro-optic effect. The voltage placed on the thin electrode 73 on the front of the member 72 and the ground potential on the electrode 73 on the back of member 72 will provide a field from front to back on the member 72 along the direction of projection of the light. See U.S. Pat. No. 3,402,001. A single one of the lines 74 will have positive potential placed thereon at any given time. Accordingly, a thin slit of light through the particular electrode, which is energized, will be subject to the electro-optic or Pockels effect which will cause the light to be rotated 90° or orthogonally. Light which has been so rotated will be extracted or filtered by the slit and will then pass through the filter 99 which is polarized horizontally. Light passing through filter 99 will then pass through lens 75 onto diffusion screen 76. The scene presented on diffusion screen 76 will be projected on the varifocal mirror 77 in like manner to that described in connection with FIG. 4.

A pulse generator 78 provides a continual stream of pulses on line 79 to the ring counter 80 which has a plurality of outputs 81, 82, 83 and 84 which serially enable gates 85, 86, 87, 88, with corresponding gates 89, 90, 91 and 92. Gates 85, 86, 87 and 88 connect the positive potential from battery 93 to the various lines 74 to the grids 73. Gates 89-92 connect various points on potentiometer 94 to the varifocal mirrors input line 95 to actuate the speaker in the varifocal mirror 77. A positive source of potential 96 and a negative source of direct current potential 97 provide positive and negative bias on potentiometer 94 relative to ground 98 in the center so that the mirror will be driven outwardly and inwardly as described in connection with FIG. 4.

Thus, when gate 85 is operated by ring counter line 81 and gate 89 is operated, the varifocal mirror 77 will be in a position which will accept the light from the left hand grid 73. Gates 86 and 90 will operate for the next grid and gates 87 and 91 will operate for the third grid and gates 88 and 92 will operate for the fourth grid. The actual design of the system is illustrated in connection with member 72. There is a very large number of vertical grid lines 73 on the member 72 in order to provide a very large number of slits which simulates the continuously moving slit 36 shown in FIG. 4.

Referring to FIG. 6, as in FIG. 1, a light source 30 which is either monochromatic and polarized or which is coherent is shown through transparency 31 focussed by lens 2 past lens stop 33 on support 34 through the slit 36 in filter 35 through lens 39 onto screen 40. Translucent screen 40 is located so that a television camera 100 may present the portions of the image presented on screen 40 to the cathode ray tube 102 which may be at a remote location. A varifocal mirror 50 is confronting the cathode ray tube 102 for the purpose of presenting the three-dimensional version of the image presented on cathode ray tube 102. The image presented on the screen 40 is scanned from left to right by the filter 35 as it is scanned across as in FIG. 4. The persistence of the phosphor on the cathode ray tube 102 will be sufficiently low so that the image will truly appear to be three-dimensional.

In place of a cathode ray tube, one may employ known display devices suitable for the performance of optical processing such as eidophor, deformable membrane tubes and display devices using thermoplastics.

What is claimed is:

1. An image projection system comprising:
   projection means for projecting an image of a three dimensional scene encoded with the projection thereon from an angle of a source of illumination adapted to cause said scene to be encoded with fragmentary zone plate modulation thereon with each fragment representing a different plane of a three dimensional scene for providing depth of range information relative to surfaces within said scene,
   filter means for filtering said images projected by said projection means,
   means for manifesting images passing through said filter from said projection means,
   whereby a simulated three dimensional scene is presented to a viewer.

2. A system in accordance with claim 1 including means cooperating with said filter for providing variable depth of range presentation of the images presented on said means for manifesting images.
   whereby the original three dimensional scene is simulated.

3. An image projection system comprising:
   projection means for projecting an image of a three dimensional scene encoded with the projection thereon from an angle of a source of illumination adapted to cause said scene to be encoded with fragmentary zone plate modulation thereon with each fragment representing a different plane of a three dimensional scene for providing depth of range information relative to surfaces within said scene,
   filter means for filtering in the plane of focus of said encoded images projected by said projection means,
   screen means for manifesting images passing through said filter aligned to receive an image from said projection means through said filter,
   whereby a simulated three dimensional view is presented to a viewer.

4. A system in accordance with claim 3 including means cooperating with said filter for providing variable depth of range presentation of the images presented on said screen means,
   whereby the original three dimensional scene is simulated.

5. An image projection system comprising:
   projection means for projecting an image of a three dimensional scene encoded with the projection thereon from an angle of a source of illumination adapted to cause said scene to be encoded with fragmentary zone plate modulation thereon with each fragment representing a different plane of a three dimensional scene,
   filter means for filtering the plane of focus of said images projected by said projection means,
   output means for manifesting images passing through said filter aligned to receive an image from said projection means through said filter,
   whereby a simulated three dimensional scene is presented to a viewer.

6. A system in accordance with claim 5 including means cooperating with said filter for providing variable depth of range presentation of the images presented on said output means,
   whereby the original three dimensional scene is simulated.

7. An image projection system comprising:
   projection means for projecting an image of a three dimensional scene encoded with the projection thereon from an angle of a source of illumination adapted to cause said scene to be encoded with fragmentary zone plate modulation thereon with each fragment representing a different plane of a three dimensional scene,
   filter means for transversely scanning a slit across the plane of focus of said images projected by said projection means,
   screen means for manifesting images passing through said filter aligned to receive an image from said projection means through said slit,
   whereby the original three dimensional scene is simulated.

8. A system in accordance with claim 7 including means synchronized with said filter for providing variable depth of range presentation of the images presented on said screen means,
   whereby the original three dimensional scene is simulated.

9. A method comprising:
   (a) partially modulating illumination of a scene with at least a portion of an optical zone plate grid, said illumination so modulated being projected from a first angle to form fragmentary zone plate modulation on said scene with each fragment representing a different plane of a three dimensional scene, (b) imaging a representation of said illuminated scene upon a photosensitive medium from a second angle to record depth of range information,
(c) filtering an image formed by illumination of the product of such representation, and
(d) projecting the filtered light upon a surface for presenting a simulated three dimensional scene to a viewer.

10. A method in accordance with claim 9 comprising: reflecting the output of said filter from a variable distance of view reflector varying its distance of view in synchronism with scanning by said filter.

11. A method comprising:
(a) partially modulating illumination of a scene with at least a portion of an optical zone plate grid, said illumination so modulated being projected from a first angle to form fragmentary zone plate modulation on said scene with each fragment representing a different plane of a three dimensional scene,
(b) imagining a representation of said illuminated scene upon a photosensitive medium from a second angle to record depth of range information,
(c) scanning a slit filter across an image formed by illumination of the product of such representation at a focal distance of the resultant optical system, and
(d) projecting the output light of said filter upon a screen for presenting a simulated three dimensional scene to a viewer.

12. A method in accordance with claim 11 comprising: reflecting the output of said filter from a variable distance of view reflector in synchronism with scanning by said filter,
whereby the original three dimensional scene is simulated.

13. A method for presenting depth of range information comprising:
(a) illuminating a scene with a light which spatially modulates a scene with a zone plate, said illumination so modulated being projected from a first angle to form fragmentary zone plate modulation on said scene with each fragment representing a different plane of a three dimensional scene,
(b) producing a representation of such an illuminated scene by imaging said scene upon a photosensitive medium from a second angle to record depth of range information,
(c) filtering a transformation of such representation,
(d) projecting the image therefrom upon a light responsive medium.

14. A method for presenting depth of range information comprising:
(a) illuminating a scene with light which spatially modulates a scene with a zone plate, said illumination so modulated being projected from a first angle to form fragmentary zone plate modulation on said scene with each fragment representing a different plane of a three dimensional scene,
(b) producing a representation of such an illuminated scene by imaging said scene upon a photosensitive medium from a second angle to record depth of range information,
(c) passing a slit filter in the image plane of the illuminating source determined by the parameters of the combined zone plate lens structure, and
(d) projecting the image therefrom upon a light responsive medium.

15. An image projection system comprising:
projection means for projecting an image of a three dimensional scene encoded with the projection thereon from an angle of a source of illumination adapted to cause said scene to be encoded with fragmentary zone plate modulation thereon with each fragment representing a different plane of a three dimensional scene for providing depth of range information relative to surfaces within said scene,
filter means for transversely scanning a slit across the plane of focus of said images projected by said projection means,
screen means for manifesting images passing through said filter aligned to receive an image from said projection means through said slit,
whereby a simulated three dimensional scene is presented to a viewer.

16. A system in accordance with claim 15 including means synchronized with said filter for providing variable depth or range presentation of the images presented on said screen means,
whereby the original three dimensional scene is simulated.

17. Apparatus in accordance with claim 15 wherein said image of a scene is encoded with an off-center projection thereon of the rings of zone plate forming fragmentary circular zone plate patterns of illumination,
whereby the original three dimensional scene can be simulated.

18. A method comprising:
(a) partially modulating illumination of a scene with at least a portion of an optical, circular zone plate grid, said illumination so modulated being projected from a first angle to form fragmentary zone plate modulation on said scene with each fragment representing a different plane of a three dimensional scene,
(b) imaging a representation of said illuminated scene upon a photosensitive medium from a second angle spaced from said first angle, recording said representation thereon including depth of range information, and producing a transparency therefrom,
(c) passing light through said transparency,
(d) scanning a slit filter across the path of illumination passing through said transparency at a focal distance of the resultant optical system, and
(e) projecting the output light from said filter upon a screen,
whereby a simulated three dimensional image is presented to a viewer.

19. A method in accordance with claim 18 including reflecting the output of said filter from a variable focal length reflector driven mechanically in synchronism with scanning by said filter,
whereby the original three dimensional scene is simulated.

20. A method including
(a) projecting a zone plate pattern upon a three-dimensional scene for the purpose of encoding the scene so that varying depth of range data may be extracted automatically, and
(b) spatially filtering an image of the three-dimensionally encoded scene for extracting three-dimensional varying depth of range data from the scene.

21. A method in accordance with claim 20, including presentation of the image of said extracted three-dimensional varying depth of range data.

22. A method in accordance with claim 20 including projection of said varying depth of range data upon a medium.

References Cited
UNITED STATES PATENTS

| 3,263,079 | 7/1966 | Mertz et al. | 350—162 ZP X |
| 3,305,834 | 2/1967 | Cooper et al. | 350—162 SF X |
| 3,402,001 | 9/1968 | Fleisher | 350—150 |
| 3,493,290 | 2/1970 | Traub | 350—295 X |
| 3,504,606 | 4/1970 | Macovski | 350—162 ZP X |

JOHN K. CORBIN, Primary Examiner

U.S. C. X.R.

350—55, 150, 162 ZP, 295; 353—98; 356—3